(12) United States Patent
Halasa et al.

(10) Patent No.: US 7,064,171 B1
(45) Date of Patent: Jun. 20, 2006

(54) NON-RANDOM STYRENE-BUTADIENE RUBBER

(75) Inventors: Adel Farhan Halasa, Bath, OH (US); Wen-Liang Hsu, Cuyahoga Falls, OH (US); David Michael Smith, Sr., Wadsworth, OH (US); Warren James Busch, North Canton, OH (US); John Joseph Andre Verthe, Kent, OH (US); Scott Edwards Johnson, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/232,685

(22) Filed: Sep. 22, 2005

(51) Int. Cl.
*C08F 236/10* (2006.01)

(52) U.S. Cl. .................... 526/340; 526/65; 525/192; 525/237; 524/76; 524/575; 152/209.1; 152/905

(58) Field of Classification Search ............... 526/340, 526/65; 525/192, 237; 524/76, 575; 152/209.1, 152/905
See application file for complete search history.

(56) References Cited

U.S. PATENT DOCUMENTS

| | | | | |
|---|---|---|---|---|
| 4,311,803 A * | 1/1982 | Smith et al. | .................. | 525/53 |
| 4,843,120 A | 6/1989 | Halasa et al. | .................. | 525/53 |
| 5,047,483 A | 9/1991 | Halasa et al. | ................ | 525/237 |
| 5,061,765 A | 10/1991 | Hsu et al. | ..................... | 526/141 |
| 5,137,998 A | 8/1992 | Hsu et al. | ..................... | 526/174 |
| 5,239,009 A | 8/1993 | Halasa et al. | ................ | 525/258 |
| 5,262,213 A | 11/1993 | Rodgers et al. | ............. | 428/368 |
| 5,272,220 A | 12/1993 | Rodgers et al. | .......... | 525/332.3 |
| 5,405,927 A | 4/1995 | Hsu et al. | ..................... | 526/337 |
| 5,620,939 A | 4/1997 | Halasa et al. | ................ | 502/154 |
| 5,627,237 A | 5/1997 | Halasa et al. | ................ | 525/236 |
| 5,654,384 A | 8/1997 | Halasa et al. | ................ | 526/174 |
| 5,677,402 A | 10/1997 | Halasa et al. | ................ | 526/174 |
| 6,140,434 A | 10/2000 | Halasa et al. | ................ | 526/174 |

* cited by examiner

*Primary Examiner*—Fred Teskin
(74) *Attorney, Agent, or Firm*—Alvin T. Rockhill

(57) ABSTRACT

The present invention reveals a tire having a tread that is comprised of (1) 30 phr to 80 phr of a non-random styrene-butadiene rubber comprised of polymer chains that are derived from styrene and 1,3-butadiene, wherein from about 10 weight percent to about 50 weight percent of the repeat units in the styrene-butadiene rubber are derived from styrene, wherein from about 60 weight percent to about 90 weight percent of the repeat units in the styrene-butadiene rubber are derived from 1,3-butadiene, wherein from about 30 weight percent to about 50 weight percent of the styrene repeat units are in sequences containing 5 to 20 styrene repeat units, wherein the bound styrene content found in the first half of the polymer chains differs from the bound styrene content found in the second half of the polymer chains by at least 5 weight percent, wherein the styrene-butadiene rubber has a 1,2-vinyl content which is within the range of about 8 percent to about 20 percent, wherein the styrene-butadiene rubber has a number average molecular weight which is within the range of 200,000 to 475,000, and wherein the styrene-butadiene rubber has a glass transition temperature which is within the range of −82° C. to −50° C. and (2) 20 phr to 70 phr of polybutadiene. The tire tread formulation can optionally contain silica and lignin.

20 Claims, No Drawings

NON-RANDOM STYRENE-BUTADIENE RUBBER

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. With increasing fuel prices the need for tires that provide even lower rolling resistance to being demanded by consumers. Good tread wear is also an important consideration because it is generally the most important factor that determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in tire treads. In order to balance these two viscoelastically inconsistent properties, mixtures of various types of synthetic and natural rubber are normally utilized in tire treads. For instance various mixtures of styrene-butadiene rubber and polybutadiene rubber are commonly used in tread rubber for automobile tire treads. However, such blends are not totally satisfactory for all purposes.

Carbon black is generally included in rubber compositions that are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about –110° C. to –20° C. and exhibit a second glass transition temperature which is within the range of about –50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between –110° C. and –20° C. and subsequently continuing said polymerization in a second reaction zone at a temperature and under conditions sufficient to produce a second polymeric segment having a glass transition temperature which is between –20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about –10° C. to about –40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about –90° C. to about –70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3-butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance, and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140.

U.S. Pat. No. 5,654,384 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.05:1 to about 10:1. By utilizing a combination of sodium alkoxide and a conventional polar modifier, such as an amine or an ether, the rate of polymeriztion initiated with organolithium compounds can be greatly increased with the glass transition temperature of the polymer produced also being substantially increased. The rubbers synthesized using such catalyst systems also exhibit excellent traction properties when compounded into tire tread formulations. This is attributable to the unique macrostructure (random branching) of the rubbers made with such catalyst systems.

U.S. Pat. No. 5,620,939, U.S. Pat. No. 5,627,237, and U.S. Pat. No. 5,677,402 also disclose the use of sodium salts of saturated aliphatic alcohols as modifiers for lithium initiated solution polymerizations. Sodium t-amylate is a preferred sodium alkoxide by virtue of its exceptional solubility in non-polar aliphatic hydrocarbon solvents, such as hexane, which are employed as the medium for such solution polymerizations. However, using sodium t-amylate as the polymerization modifier in commercial operations where recycle is required can lead to certain problems. These problems arise due to the fact that sodium t-amylate reacts with water to form t-amyl alcohol during steam stripping in the polymer finishing step. Since t-amyl alcohol forms an azeotrope with hexane, it co-distills with hexane and thus contaminates the feed stream.

U.S. Pat. No. 6,140,434 discloses a process for preparing a rubbery polymer having a high vinyl content which comprises: polymerizing at least one diene monomer with a lithium initiator at a temperature which is within the range of about 5° C. to about 100° C. in the presence of a metal salt of a cyclic alcohol and a polar modifier, wherein the molar ratio of the metal salt of the cyclic alcohol to the polar modifier is within the range of about 0.1:1 to about 10:1; and wherein the molar ratio of the metal salt of the cyclic alcohol to the lithium initiator is within the range of about 0.05:1 to about 10:1. U.S. Pat. No. 6,140,434 is based upon the discovery that metal salts of cyclic alcohols will act as highly effective modifiers that do not co-distill with hexane or form compounds during steam stripping which co-distill with hexane. The use of metal salts of cyclic alcohols accordingly solves the problem of recycle stream contamination. Additionally, these modifiers provide similar modification efficiencies to sodium t-amylate. Since the boiling points of these metal salts of cyclic alcohols are very high, they do not co-distill with hexane and contaminate recycle streams. Metal salts of cyclic alcohols are also considered to be environmentally safe. In fact, sodium mentholate is used as a food additive.

U.S. Pat. No. 5,262,213 discloses a styrene-butadiene rubber (SBR) which is particularly valuable for use in making truck tire treads, said rubber being comprised of repeat units which are derived from about 10 weight percent to about 20 weight percent styrene and from about 80 weight percent to about 90 weight percent 1,3-butadiene, wherein the repeat units derived from styrene and 1,3-butadiene have a sequence distribution wherein at least about 55% of the styrene repeat units are in blocks of only one styrene repeat unit, wherein at least about 75% of the styrene repeat units are in blocks of 1 or 2 repeat units, and wherein at least about 5% of the styrene repeat units are in blocks of more than 8 repeat units, wherein from about 32% to about 40% of the repeat units derived from the 1,3-butadiene are of the cis-microstructure, wherein from about 50% to about 60% of the repeat units derived from the 1,3-butadiene are of the trans-microstructure, wherein from about 6% to about 15% of the repeat units derived from the 1,3-butadiene are of the vinyl-microstructure, wherein the rubber has a glass transition temperature which is within the range of about −85° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

SUMMARY OF THE INVENTION

The non-random styrene-butadiene rubber and styrene-isoprene rubber of this invention can be utilized in making tire tread formulations having a balanced combination of properties including excellent traction characteristics, wear resistance, and low rolling resistance. These tire tread formulations are made by blending the non-random styrene-butadiene rubber or non-random styrene-isoprene rubber with high cis-1,4-polybutadiene. No additional elastomers are needed in such tire tread formulations. However, up to about 30 phr of natural rubber can optionally be included in the tread formulation if better rolling resistance is desired. The tire tread formulations made with the non-random solution polymers of this invention can be filled with carbon black and/or silica. It is particularly advantageous for the rubber formulation to utilize silica as a filler with exceptionally beneficial performance characteristics being obtained in cases where such silica filled formulations further include lignin.

The subject invention more specifically discloses a non-random rubbery polymer having characteristics which are particularly beneficial for utilization for manufacturing tire tread compounds, said non-random rubbery polymers being comprised of polymer chains that are derived from a vinyl aromatic monomer and a conjugated diolefin monomer, wherein from about 10 weight percent to about 40 weight percent of the repeat units in the rubbery polymer are derived from the vinyl aromatic monomer, wherein from about 60 weight percent to about 90 weight percent of the repeat units in the rubbery polymer are derived from the conjugated diolefin monomer wherein from about 30 weight percent to about 50 weight percent of the vinyl aromatic repeat units are in sequences containing 5 to 20 vinyl aromatic monomer repeat units, wherein the bound vinyl aromatic monomer content found in the first half of the polymer chains differs from the bound vinyl aromatic monomer content found in the second half of the polymer chains by at least 5 weight percent, wherein the rubbery polymer has a 1,2-vinyl content which is within the range of about 8 percent to about 20 percent, wherein the rubbery polymer has a number average molecular weight which is within the range of 100,000 to 475,000, and wherein the rubbery polymer has a glass transition temperature which is within the range of –82° C. to –50° C.

The subject invention more specifically discloses a rubber formulation which is particularly beneficial for utilization in manufacturing tire treads, said composition being comprised of (1) 30 phr to 80 phr of a non-random styrene-butadiene rubber comprised of polymer chains that are derived from styrene and 1,3-butadiene, wherein from about 10 weight percent to about 40 weight percent of the repeat units in the styrene-butadiene rubber are derived from styrene, wherein from about 60 weight percent to about 90 weight percent of the repeat units in the styrene-butadiene rubber are derived from 1,3-butadiene, wherein from about 30 weight percent to about 50 weight percent of the styrene repeat units are in sequences containing 5 to 20 styrene repeat units, wherein the bound styrene content found in the first half of the polymer chains differs from the bound styrene content found in the second half of the polymer chains by at least 5 weight percent, wherein the styrene-butadiene rubber has a 1,2-vinyl content which is within the range of about 8 percent to about 20 percent, wherein the styrene-butadiene rubber has a number average molecular weight which is within the range of 200,000 to 475,000, and wherein the styrene-butadiene rubber has a glass transition temperature which is within the range of –82° C. to –70° C. and is more typically within the range of –82° C. to –50° C. and (2) 20 phr to 70 phr of high cis-1,4-polybutadiene.

The present invention more specifically discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is a cured the rubber formulation which is comprised of (1) 30 phr to 80 phr of a non-random styrene-butadiene rubber comprised of polymer chains that are derived from styrene and 1,3-butadiene, wherein from about 10 weight percent to about 40 weight percent of the repeat units in the styrene-butadiene rubber are derived from styrene, wherein from about 60 weight percent to about 90 weight percent of the repeat units in the styrene-butadiene rubber are derived from 1,3-butadiene, wherein from about 30 weight percent to about 50 weight percent of the styrene repeat units are in sequences containing 5 to 20 styrene repeat units, wherein the bound styrene content found in the first half of the polymer chains differs from the bound styrene content found in the second half of the polymer chains by at least 5 weight percent, wherein the styrene-butadiene rubber has a 1,2-vinyl content which is within the range of about 8 percent to about 20 percent, wherein the styrene-butadiene rubber has a number average molecular weight which is within the range of 200,000 to 475,000, and wherein the styrene-butadiene rubber has a glass transition temperature which is within the range of –82° C. to –70° C. and (2) 20 phr to 70 phr of high cis-1,4-polybutadiene.

DETAILED DESCRIPTION OF THE INVENTION

The non-random rubbery polymers of this invention are synthesized by solution polymerization. Such solution polymerizations will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 10 weight percent to about 20 weight percent vinyl aromatic monomer, such as styrene and from about 80 weight percent to about 90 weight percent of the conjugated diolefin monomer, such as 1,3-butadiene monomer or isoprene monomer. It is typically preferred for the monomer charge composition to contain from about 16 weight percent to about 19 weight percent styrene and from about 81 weight percent to about 84 weight percent 1,3-butadiene or isoprene. It is generally more preferred for the monomer charge composition to include about 18 weight percent styrene and about 82 weight percent 1,3-butadiene or isoprene.

The non-random rubbery polymers of this invention are synthesized on a continuous basis. In this continuous process, the monomers, and an organolithium initiator, and a gel inhibiting agent are continuously fed into a series of two or more continuously operating reaction vessels. The pressure in the reaction vessels is typically sufficient to maintain a substantially liquid phase under the conditions of the polymerization reaction. It is critical for the polymerization reaction to be conducted isothermally at a temperature which is within the range of 160° F. to 240° F. (71° C. to 116° C.) and which is preferably within the range of 170° F. to 210° F. (77° C. to 99° C.). The isothermal polymerization temperature is most preferably within the range of 180° F. to 200° F. (82° C. to 93° C.). Under the isothermal polymerization conditions which are maintained throughout the polymerization, the temperature is not normally allowed to fluctuate by more than ±10° F. (±6° C.) with the polymerization temperature preferably being maintained within ±5° F. (±3° C.) of the isothermal polymerization set point temperature.

The organolithium compounds which can be utilized as initiators in the copolymerizations of this invention include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred are alkyllithium compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of organolithium initiator employed will be dependent upon the molecular weight which is desired for the non-random rubbery polymer being synthesized. An amount of organolithium initiator will be selected to result in the production of a polymer having a number average molecular weight which is within the range of about 100,000 to about 475,000. The amount of organolithium initiator will preferably be selected to result in the production of a polymer having a number average molecular weight which is within the range of about 300,000 to 400,000.

As a general rule in all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is critical to carry out the polymerization in the presence of 1,2-butadiene and/or a polar modifier, such as N,N,N',N'-tetramethylethylenediamine (TMEDA). For this reason 1,2-butadiene and/or the polar modifier will also be continuously fed into the reaction vessel utilized. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm. The TMEDA will typically be present at a molar ratio of TMEDA to the organolithium compound which is within the range of about 0.01:1 to about 0.2:1. A molar ratio of TMEDA to the organolithium initiator of greater than about 0.2:1 should not be exceeded because the TMEDA acts as a polymerization modifier and increases the glass transition temperature of the non-random rubbery polymer produced.

To keep the glass transition temperature of the non-random rubbery polymer within the desired range of −82° C. to −50° C. and preferably within the range of −80° C. to −70° C., the amount of the polar modifier employed should be the minimum amount required to inhibit gelation. A molar ratio of polar modifier to the organolithium compound of greater than about 0.2:1 will typically not be exceeded because such high ratios of polar modifier to the organolithium compound can result in the non-random rubbery polymer produced having a glass transition temperature of greater than −70° C. As a general rule, a molar ratio of polar modifier to the organolithium compound which is within the range of about 0.05:1 to about 0.15:1 will be employed. It is typically more preferred for the molar ratio of polar modifier to the organolithium compound to be within the range of about 0.08:1 to about 0.12:1.

After a monomer conversion of about 70% to about 100% is achieved, the living intermediate polymer is optionally coupled with a coupling agent, such as divinyl benzene, tin tetrachloride or silicon tetrachloride. This is typically done in a subsequent reaction vessel after the desired degree of polymerization has been attained in previous reaction vessels. For instance, the living intermediate polymer can be pumped from a third reaction vessel to a fourth reaction vessel where the coupling agent is added to the polymerization medium. The coupling agent is preferably added after a monomer conversion of 72% to 90% has been attained and is more preferably added after a monomer conversion of 75% to 85% has been attained. The amount of coupling agent added can be sufficient to totally couple or to partially couple the non-random rubbery polymer.

The coupling agent is preferably added at a level which is sufficient to jump the molecular weight of the polymer to the desired degree without killing all of the living intermediate polymer chains. In the absence of coupling agents, all of the polymer chains can grow to completion (but no molecular weight jumping can occur). At a molar ratio of organolithium initiator to coupling agent of 4 or greater, complete coupling is possible, but because the coupling is by termination, further polymerization and higher levels of conversion cannot be attained. The optimum level is, of course, between these two extremes. As a general rule, the molar ratio of organolithium compound to the coupling agent will be within the range of about 6:1 to about 20:1. Molar ratios of the organolithium compound to the coupling agent which are within the range of about 8:1 to about 12:1 are preferred because they induce sufficient coupling to achieve the desired increased in molecular weight while leaving an adequate number of living chains to attain acceptable conversion levels. Since there are fewer living chains after the coupling, those that are still living attain a higher molecular weight than would otherwise have been achieved had the coupling agent not been utilized.

Since the living intermediate polymer is only partially coupled, living polymer chains still exist after the coupling step. In the third step of the copolymerization process, the copolymerization is allowed to continue with the still living polymer chains increasing in molecular weight as the copolymerization continues. The copolymerization is allowed to continue in this step until a conversion in excess of about 95 percent is attained. It is preferred for the conversion to be in excess of about 98 percent with essentially quantitative conversions of greater than about 99 percent preferably being reached.

The non-random rubbery polymer produced is then recovered from the organic solvent. The non-random rubbery polymer can be recovered from the organic solvent by standard techniques, such as decantation, filtration, centrification and the like. It is often desirable to precipitate the non-random rubbery polymer from the organic solvent by the addition of lower alcohols containing from 1 to about 4 carbon atoms to the polymer solution. Suitable lower alcohols for precipitation of the non-random rubbery polymer from the polymer cement include methanol, ethanol, isopropyl alcohol, n-propyl alcohol and t-butyl alcohol. The utilization of lower alcohols to precipitate the non-random rubbery polymer from the polymer cement also "kills" the living non-random rubbery polymer chains by inactivating lithium end groups. After the non-random rubbery polymer is recovered from the organic solvent, steam stripping can be employed to reduce the level of volatile organic compounds in the rubber.

The non-random rubbery polymer made by the process of this invention is characterized by being comprised of repeat units which are derived from about 10 weight percent to about 40 weight percent vinyl aromatic monomer and from about 60 weight percent to about 90 weight percent conjugated diolefin monomer. The non-random rubbery polymer will typically contain from about 15 weight percent to 30 weight percent of the vinyl aromatic monomer and from 70 weight percent to 85 weight percent of the conjugated diolefin monomer. The vinyl aromatic monomer will preferably be α-methylstyrene or styrene and is preferably styrene. The conjugated diolefin monomer is typically isoprene or 1,3-butadiene.

The non-random rubbery polymer will typically have a 1,2-microstructure content of about 10% to 20% and will preferably have a 1,2-microstructure content of 12% to 15%. In these non-random rubbery polymers 30% to 50% of the vinyl aromatic repeat units will be present in blocks that are of 5 to 20 units in length. The bound vinyl aromatic monomer content found in the first half of the polymer chains of the non-random rubbery polymers will differ from the bound content of the vinyl aromatic monomer found in the second half of the polymer chains by at least 5 weight percent. In other words, if the polymer chains of the rubbery polymer were cut in half, the first half of the polymer chains could contain 17.5% bound styrene and the second half of the polymer chains could contain 22.5% bound styrene with the bound styrene content of the first half of the polymer chains differing from the bound styrene content of the second half of the polymer chains by 5%. The difference between the bound vinyl aromatic monomer content of the first half of the polymer chains will preferably differ from the bound vinyl aromatic monomer content of the second half of the polymer chains by at least 7%.

The repeat units derived from the vinyl aromatic monomer and the conjugated diolefin monomer in the non-random rubbery polymer have a sequence distribution which is critical to obtain the desired characteristics when used in making tire tread formulations. For instance, it is critical for 30% to 50% of the vinyl aromatic repeat units in the polymer to be present in sequences which are of 5 to 20 repeat units in length. Preferably, in the case of non-random styrene-butadiene rubber, from about 34% to about 38% of the repeat units derived from the 1,3-butadiene are of the cis-microstructure. Preferably, from about 53% to about 57% of the repeat units derived from the 1,3-butadiene are of the trans-microstructure. Preferably, from about 7% to about 12% of the repeat units derived from the 1,3-butadiene are of the vinyl-microstructure. It is preferred for the non-random SBR to have a glass transition temperature which is within the range of about –80° C. to about –75° C.

The SBR will typically have a number average molecular weight which is within the range of about 100,000 to about 475,000. The SBR will more typically have a number average molecular weight which is within the range of 200,000 to 450,000. It is preferred for the SBR to have a weight average molecular weight which is within the range of about 300,000 to about 400,000. It is preferred for the SBR to have an inhomogeneity (u) which is within the range of about 0.8 to 1.2. Inhomogeneity is defined by the equation u=(Mw/Mn)-1, wherein Mw represents the weight average molecular weight of the non-random rubbery polymer and wherein Mn represents the number average molecular weight of the non-random rubbery polymer. In other words, the ratio of the weight average molecular weight of the SBR to its number average molecular weight is preferably 2:1.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

The non-random rubbery polymers of this invention are particularly valuable for use in making tire tread formulations for automobiles and light trucks. The non-random rubbery polymers of this invention are blended with 20 phr (parts per hundred parts of rubber) to 70 phr of polybutadiene in making the tire tread formulations of this invention. The polybutadiene used can be of any microstructure, for instance, it can be medium vinyl-polybutadiene or high cis-1,4-polybutadiene. It is preferred for the polybutadiene to be high cis-1,4-polybutadiene. Normally, 40 phr to 60 phr of the polybutadiene rubber will be blended with 40 phr to 60 phr of the non-random rubbery polymer. However, in cases where it is desirable to further improve rolling resistance, natural rubber can also be included in the tire tread formulation. Such a tire tread formulation could contain 10 phr to 30 phr of natural rubber, 10 phr to 30 phr of high cis-1,4-polybutadiene rubber, and 40 phr to 80 phr of the non-random rubbery polymer. The high cis-1,4-polybutadiene utilized in such blends typically has a microstructure wherein at least 80% of the butadiene repeat units are cis 1,4-isomeric units. In most cases, the high cis-1,4-polybutadiene will contain at least about 90% cis-1,4-isomeric butadiene units. The high cis-1,4-polybutadiene can be prepared by solution polymerization utilizing a catalyst consisting of (1) an organoaluminum compound, (2) an organonickel compound, and (3) a hydrogen fluoride complex as described in U.S. Pat. No. 3,856,764.

These non-random rubbery polymer containing blends can be compounded utilizing conventional ingredients and standard techniques. For instance, the non-random rubbery polymer containing blends will typically be blended with carbon black, sulfur, fillers, accelerators, oils, waxes, scorch inhibiting agents, and processing aids. In most cases, the non-random rubbery polymer containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 phr to 150 phr of at least one filler will be utilized in the blend with 30 phr to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The non-random rubbery polymer containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

To fully realize the total advantages of the non-random rubbery polymers of this invention in tire tread formulations, silica will normally be included in the tread rubber formulation. The processing of the non-random rubbery polymer blend is normally conducted in the presence of a sulfur containing organosilicon compound to realize maximum benefits. Examples of suitable sulfur containing organosilicon compounds are of the formula:

in which Z is selected from the group consisting of

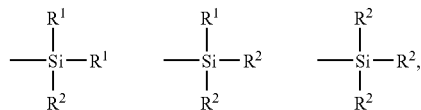

and where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis (tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxydiethoxysilylethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxyxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to formula I, preferably Z is

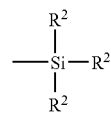

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably the amount of the compound of formula I will range from about 0.05 to about 0.25 parts by weight per part by weight of the silica.

In addition to the sulfur containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica. For instance the silica can include pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

It is particularly desirable to include lignin in silica filled tire tread formulations. Lignin further improves filler/polymer compatibility and reduces the overall weight of the tire tread formulation. The lignin can be a lignosulfonate (also called lignin sulfonate and sulfite lignin) or a kraft lignin (also called sulfate lignin). The lignin will typically be included in the tire tread formulation at an amount which is within the range of 10 phr to 80 phr and will more typically be present at an amount which is within the range of 15 phr to 30 phr. Starch can also beneficially be utilized as a filler in such compositions in addition to the lignin at an amount which is within the range of 10 phr to 50 phr and which is more typically within the range of 15 phr to 30 phr.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-procuctive mix stage(s). The rubber, silica and sulfur containing organosilicon, and carbon black if used, are mixed in one or more non-productive mix stages. The terms "non-productive" and "productive" mix stages are well known to those having skill in the rubber mixing art.

The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The non-random rubbery polymer containing rubber blends of this invention can be used in tire treads in conjunction with ordinary tire manufacturing techniques. Tires are built utilizing standard procedures with the non-random rubbery polymer being blended with a polybutadiene rubber. As has been noted, it is preferred for such tire tread formulations to be filled with both silica and lignin. After the tire has been built with the non-random rubbery polymer containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1–4

In this series of experiments, a copolymerization of 1,3-butadiene and styrene was conducted on a continuous basis. These polymerizations were conducted in a continuous reactor chain that included a first reactor having a capacity of 5 gallons (19 liters) and a second reactor having a capacity of 10 gallons (38 liters). The reactors were jacketed for temperature control and were agitated with 2 axial flow turbine (AFT) impellers in each reactor. The reactors were run liquid full by pressure feeding in the bottom and exiting from the top of each reactor. Process flows and reactor temperatures were controlled by a distributed control system with appropriate instrumentation and valve control.

The primary monomer premix (50% monomer in hexane) was recirculated through the appropriate premix tank drying beds containing molecular sieves and silica gel. The premix flow was then fed (single pass) through the large drying beds that also contained molecular sieves and silica gel. Additional hexane was recirculated through the hexane tank silica gel columns. The hexane was transferred to the feed tanks, as needed, where normal-butyl lithium (n-BuLi) was added to reduce the scavenger level (addition amount based on 10 ppm scavenger) prior to feeding the reactors through a large drying column. The hexane and primary premix flows were combined and controlled to maintain the desired overall monomer concentration.

The primary initiator, n-butyllithium (n-BuLi), was fed to the first reactor through a separate port from the remainder of the feeds. Tetramethylethylenediamine (TMEDA) and 1,2 butadiene were combined, for use in gel inhibition, with the monomer premix and hexane feeds prior to entering the first reactor. The additional feeds of divinyl benzene (DVB), silicon tetrachloride (SiCl$_4$) and sodium menthonate varied depending on the experiment. The stabilizer package, consisting of rosin acid and Polystay K antioxidant was fed to the first terminator mixer. A detailed description of the three copolymerization runs conducted in this series of experiments follows.

Example 1

Primary premix feed: 50% monomer in hexane at 96.53 g/min (21% styrene/79% butadiene)
Hexane feed: 171.61 g/min
Overall monomer concentration: 18%
Reactor temperatures: 88° C. in the first reactor, 96° C. in the second reactor
Total Reaction Residence time: 2.4 hours (first and second reactors)
n-BuLi: 1.0 mmoles/100 g monomer (mmphm)
TMEDA: 0.08 moles/mole n-BuLi
DVB: 0.05 moles/mole n-BuLi (for cold flow inhibition)
1,2-butadiene: 175 ppm on total monomer

Example 2

In this experiment the polymerization temperature was increased with respect to the temperature utilized in Example 1. The process conditions used were as follows:
Primary premix feed: 50% monomer in hexane at 96.53 g/min (21% styrene/79% butadiene)
Hexane feed: 171.61 g/min
Overall monomer concentration: 18%
Reactor temperatures: 99° C. in the first reactor, 104° C. in the second reactor
Total Reaction Residence time: 2.4 hours (total in the first and second reactors)
n-BuLi: 1.0 mmoles/100 g monomer (mmphm)
TMEDA: 0.08 moles/mole n-BuLi
DVB: 0.05 moles/mole n-BuLi (for cold flow inhibition)
1,2-butadiene: 175 ppm on total monomer

Example 3

In this experiment the DVB charge was increased with respect to the levels used in Example 1 and Example 2 (from 0.05 mol/mol BuLi to 0.25 mol/mol BuLi) to produce a more branched polymer. The process conditions were as follows:
Primary premix feed: 50% monomer in hexane at 96.53 g/min (21% styrene/79% butadiene)
Hexane feed: 171.61 g/min
Overall monomer concentration: 18%
Reactor temperatures: 99° C. in the first reactor, 104° C. in the second reactor
Total Reaction Residence time: 2.4 hours (total residence time in both reactors)
n-BuLi: 1.27 mmoles/100 g monomer (mmphm)
TMEDA: 0.08 moles/mole n-BuLi
DVB: 0.25 moles/mole n-BuLi
1,2-butadiene: 150 ppm on total monomer The non-random styrene-butadiene rubber recovered had a Mooney ML4 viscosity of 74, a glass transition temperature of −79° C., a weight average molecular weight of 475,000, and a 1,2-vinyl content of 12%. The amount of bound styrene content in the first half of the polymer also differed from the bound styrene content in the second half of the polymer by more than 5%.

Example 4

The objective of this continuous copolymerization was to produce a linear, high molecular weight, low vinyl, non-random styrene-butadiene rubber. The process conditions that were used were as follows:
Primary premix feed: 50% monomer in hexane at 96.53 g/min (21% styrene/79% butadiene)
Hexane feed: 171.61 g/min
Overall monomer concentration: 18%
Reactor temperatures: 99° C. in the first reactor, 104° C. in the second reactor
Total Reaction Residence time: 2.4 hours (total residence time in both reactors)
n-BuLi: 0.98 mmoles/100 g monomer (mmphm)
TMEDA: 0.06 moles/mole n-BuLi
DVB: 0.05 moles/mole n-BuLi (for cold flow inhibition)
1,2-butadiene: 150 ppm on total monomer

Example 5

The reactor configuration used in Examples 1–4 was also used in this continuous copolymerization except for the fact that silicon tetrachloride (SiCl$_4$) was continuously fed into the second reactor as a coupling agent in place of the divinyl benzene (DVB). The process conditions used were as follows:
Primary premix feed: 50% monomer in hexane at 96.53 g/min (21% styrene/79% butadiene)
Hexane feed: 171.61 g/min
Overall monomer concentration: 18%
Reactor temperatures: 99° C. in the first reactor, 104° C. in the second reactor
Total Reaction Residence time: 2.4 hours (total residence time in both reactors)
n-BuLi: 1.27 mmoles/100 g monomer (mmphm)
TMEDA: 0.06 moles/mole n-BuLi
SiCl$_4$: 0.12 moles/mole n-BuLi
1,2-butadiene: 150 ppm on total monomer The non-random styrene-butadiene rubber recovered had a Mooney ML4 viscosity of 85, a glass transition temperature of −79° C., a weight average molecular weight of 374,000, and a 1,2-vinyl content of 12%. The amount of bound styrene content in the first half of the polymer also differed from the bound styrene content in the second half of the polymer by more than 5%.

Example 6

In this experiment the reactor configuration used in Examples 1–4 was also utilized except that no branching agent was fed into the second reactor. However, sodium mentholate (SMT) was continuously fed into the first reactor with the monomer fed. The process conditions used were as follows:

Primary premix feed: 50% monomer in hexane at 96.53 g/min (21% styrene/79% butadiene)
Hexane feed: 171.61 g/min
Overall monomer concentration: 18%
Reactor temperatures: 99° C. in the first reactor, 104° C. in the second reactor
Total Reaction Residence time: 2.4 hours (total residence time in both reacotrs)
n-BuLi: 1.27 mmoles/100 g monomer (mmphm)
TMEDA: 0.06 moles/mole n-BuLi
$SiCl_4$:0.12 moles/mole n-BuLi
1,2-butadiene: 150 ppm on total monomer

Example 7

In this experiment the reactor configuration used in Examples 1–4 was also utilized except that no branching agent was fed into the second reactor. However, sodium mentholate was continuously fed into the first reactor with the n-butyl lithium initiator. This experiment was similar to Example 6 except for the fact that the sodium mentholate was fed into the first reactor with the initiator rather than the monomer fed. The process conditions used were as follows:

Primary premix feed: 50% monomer in hexane at 96.53 g/min (21% styrene/79% butadiene)
Hexane feed: 171.61 g/min
Overall monomer concentration: 18%
Reactor temperatures: 99° C. in the first reactor, 104° C. in the second reactor
Total Reaction Residence time: 2.4 hours (total residence time in both reactors)
n-BuLi: 0.88 mmoles/100 g monomer (mmphm)
TMEDA: 0.04 moles/mole n-BuLi
SMT: 0.085 moles/mole n-BuLi (for cold flow inhibition)
1,2-butadiene: 150 ppm on total monomer The non-random styrene-butadiene rubber recovered had a Mooney ML4 viscosity of 80, a glass transition temperature of −72° C., a weight average molecular weight of 389,000, and a 1,2-vinyl content of 14%. The amount of bound styrene content in the first half of the polymer also differed from the bound styrene content in the second half of the polymer by more than 5%.

Examples 8–11

In this series of experiments some of the non-random styrene-butadiene rubbers of this invention were compounded, cured, and tested for physical properties. The compositions of the formulations and the results of physical testing are shown in Table 1. The cis-1,4-polybutadiene rubber utilized in these compound studies was Budene® 1207 from The Goodyear Tire & Rubber Company.

TABLE 1

| Example | 8 | 9 | 10 | 11 |
|---|---|---|---|---|
| Natural Rubber | 30 | 30 | 30 | 30 |
| Cis-1,4-polybutadiene rubber | 25 | 25 | 25 | 25 |
| Non-Random SBR (DVB)[1] | 45 | | | |
| Non-Random SBR $(SiCl_4)$[2] | | 45 | | |
| Non-Random (High MW)[3] | | | 45 | |
| Non-Random SBR (SMT)[4] | | | | 45 |
| Carbon Black | 60 | 60 | 60 | 60 |
| Aromatic Oil | 12 | 12 | 12 | 12 |
| Accelerator | 1.60 | 1.60 | 1.60 | 1.60 |
| Sulfur | 1.00 | 1.00 | 1.00 | 1.00 |
| ATS | | | | |
| 100% Modulus (MPa) | 2.20 | 2.04 | 2.22 | 2.11 |
| 300% Modulus (MPa) | 11.39 | 10.80 | 11.17 | 10.97 |
| Modulus Ratio (300/100) | 5.18 | 5.29 | 5.03 | 5.20 |
| Break Str (MPA) | 19.41 | 19.1 | 17.99 | 19.05 |
| % Elongation | 463 | 473 | 444 | 469 |
| Hardness @ RT | 69.1 | 69.5 | 71.1 | 69.2 |
| Hardness @ 100 C | 63.8 | 64.2 | 65.2 | 63.4 |
| Rebound @ RT | 42.8 | 42.6 | 41.7 | 41.0 |
| Rebound @ 100 C | 53.9 | 54.8 | 54.3 | 53.2 |
| Specific Gravity | 1.124 | 1.122 | 1.125 | 1.125 |
| True Tensile | 109.3 | 109.4 | 97.9 | 108.4 |
| Tensile Product | 8987 | 9034 | 7988 | 8934 |
| FDF Tear | 40.6 | 43.8 | 39.7 | 42.8 |
| FDF | 3.36 | 3.22 | 2.31 | 3.03 |
| RPA 500 (KPa) | | | | |
| uncured G' (15%, 100 C, 0.83 Hz) | 250 | 262 | 292 | 267 |
| T'02 | 1.38 | 1.32 | 1.32 | 1.17 |
| T'25 | 6.26 | 6.30 | 6.33 | 6.44 |
| T'90 | 14.96 | 15.26 | 15.24 | 15.78 |
| G' (1%, 100 C, 1 Hz) | 2855 | 2853 | 3281 | 2971 |
| G' (10%, 100 C, 1 Hz) | 1660 | 1683 | 1849 | 1677 |
| G' (50%, 100 C, 1 Hz) | 1130 | 1139 | 1228 | 1114 |
| G' (100%, 100 C, 1 Hz) | 896 | 896 | 957 | 869 |
| TD (10%, 100 C, 1 Hz) | 0.147 | 0.149 | 0.153 | 0.160 |
| DIN Abrasion 10 N (145) | | | | |
| Relative Volume Loss | 69 | 67 | 71 | 70 |
| Strebler To Self - 95° C. (177) | | | | |
| SS Ave Load (N) | 121.61 | 125.09 | 123.99 | 128.50 |
| SS Ave Peak Load (N) | 153.23 | 160.23 | 155.90 | 160.20 |
| Appearance | 5 | 5 | 5 | 5 |
| SS Ave Load (N) | | | | |
| SS Ave Peak Load (N) | | | | |
| Appearance | | | | |
| ODR 150° C. (22) | | | | |
| Max Torque | 43.61 | 42.33 | 45.32 | 42.38 |
| Min Torque | 11.49 | 10.74 | 11.94 | 10.83 |
| Final | 43.60 | 42.32 | 45.31 | 42.37 |
| TS1 | 4.67 | 5.04 | 5.09 | 5.27 |
| T25 | 7.31 | 7.87 | 8.00 | 8.16 |
| T90 | 14.47 | 16.02 | 16.01 | 17.12 |
| Delta Torque | 32.12 | 31.59 | 33.38 | 31.55 |
| % Reversion | 0.03% | 0.03% | 0.03% | 0.03% |
| Tanδ | 0.198 | 0.197 | 0.194 | 0.200 |
| E' | 14.43 | 14.35 | 16.21 | 15.39 |
| E'' | 2.86 | 2.83 | 3.15 | 3.08 |
| R | 28.7 | 28.9 | 29.4 | 28.3 |
| N | 75.93 | 74.96 | 83.50 | 81.67 |
| Hx | 122.9 | 121.8 | 136.6 | 131.7 |
| Hf | 95.9 | 92.7 | 105.1 | 99.2 |
| Loss Compliance | 0.013 | 0.013 | 0.012 | 0.013 |
| RSA III Temp Sweep (430) | | | | |
| E' @ 60° C. (mPa) | 23.5 | 24.1 | 35.6 | 29.2 |
| Tan δ @ 60° C. | 0.117 | 0.136 | 0.120 | 0.117 |
| Tg - C (Max E'') | −75 | −73 | −73 | −69 |
| Tg - C (Max Tan δ)) | −52 | −52 | −52 | −50 |
| Grosch Abrasion (5151) | | | | |
| Medium | 76.30 | 74.42 | 77.00 | 79.20 |
| High | 474.10 | 459.70 | 481.20 | 496.20 |
| Rating (High Severity) | 103 | 105 | 101 | 98 |

TABLE 1-continued

| Example | 8 | 9 | 10 | 11 |
|---|---|---|---|---|
| RDS Temp Sweep (5196) | | | | |
| Tan δ @ 0° C. | 0.162 | 0.174 | 0.163 | 0.176 |
| Tan δ @ −10° C. | 0.168 | 0.179 | 0.164 | 0.182 |
| Tan δ @ −20° C. | 0.175 | 0.187 | 0.168 | 0.189 |

[1] The non-random DVB coupled SBR made in Example 3.
[2] The non-random SiCl₄ coupled SBR made in Example 5.
[3] The non-random, high molecular weight SBR made in Example 4.
[4] The non-random sodium mentholate modified SBR made in Example 7.

As can be seen from the data in Table 1, the cured rubber formulations made with non-random styrene-butadiene rubbers evaluated had excellent characteristics for utilization as tire tread rubbers. These rubber formulations have the attributes needed for excellent traction on wet or dry pavements and good resistance to wear for long service life. They also exhibit low hysteresis which results in minimal tire heat build-up and low rolling resistance. The non-random styrene-butadiene rubber of this invention can accordingly be used in tires having improved fuel economy without sacrificing traction characteristics or tread life.

Examples 12–16

A series of non-random isoprene-butadiene rubbers were synthesized by utilizing the procedure described in Example 1 utilizing various charge ratios of isoprene to styrene. The non-random styrene-isoprene rubbers made were characterized as reported in Table 2.

TABLE 2

| Example | S/T Ratio[1] | Tg | Styrene Blocks | Random Styrene | 3,4 Isoprene | 1,4 Isoprene | Mn |
|---|---|---|---|---|---|---|---|
| 12 | 15/85 | −61° C. | 8% | 6% | 6% | 8.0% | 534,000 |
| 13 | 20/80 | −59° C. | 11% | 10% | 4% | 7.5% | 452,000 |
| 14 | 25/75 | −58° C. | 17% | 8% | 4% | 7.1% | 327,000 |
| 15 | 35/65 | −57° C. | 25% | 9% | 5% | 6.1% | 136,000 |
| 16 | 40/60 | −54° C. | 31% | 11% | 4% | 5.4% | 342,000 |

[1] Styrene to Isoprene ratio

While certain representative embodiments and details have been shown for the purpose of illustrating the subject invention, it will be apparent to those skilled in this art that various changes and modifications can be made therein without departing from the scope of the subject invention.

What is claimed is:

1. A non-random rubbery polymer having characteristics which are particularly beneficial for utilization for manufacturing tire tread compounds, said non-random rubbery polymers being comprised of polymer chains that are derived from a vinyl aromatic monomer and a conjugated diolefin monomer, wherein from about 10 weight percent to about 40 weight percent of the repeat units in the rubbery polymer are derived from the vinyl aromatic monomer, wherein from about 60 weight percent to about 90 weight percent of the repeat units in the rubbery polymer are derived from the conjugated diolefin monomer wherein from about 30 weight percent to about 50 weight percent of the vinyl aromatic repeat units are in sequences containing 5 to 20 vinyl aromatic monomer repeat units, wherein the bound vinyl aromatic monomer content found in the first half of the polymer chains differs from the bound vinyl aromatic monomer content found in the second half of the polymer chains by at least 5 weight percent, wherein the rubbery polymer has a 1,2-vinyl content which is within the range of about 8 percent to about 20 percent, wherein the rubbery polymer has a number average molecular weight which is within the range of 100,000 to 475,000, and wherein the rubbery polymer has a glass transition temperature which is within the range of −82° C. to −50° C.

2. A non-random rubbery polymer as specified in claim 1 wherein the non-random rubbery polymer has a number average molecular weight which is within the range of 300,000 to 400,000.

3. A non-random rubbery polymer as specified in claim 2 wherein the non-random rubbery polymer has a 1,2-vinyl content which is within the range of 10 percent to 15 percent.

4. A non-random rubbery polymer as specified in claim 3 wherein said non-random rubbery polymer has a Mooney ML4 viscosity which is within the range of 60 to 120.

5. A non-random rubbery polymer as specified in claim 4 wherein the vinyl aromatic monomer is styrene, wherein the conjugated diolefin monomer is 1,3-butadiene, and wherein the non-random rubbery polymer is styrene-butadiene rubber.

6. A non-random rubbery polymer as specified in claim 4 wherein the vinyl aromatic monomer is styrene, wherein the conjugated diolefin monomer is isoprene, and wherein the non-random rubbery polymer is styrene-isoprene rubber.

7. A rubber formulation which is particularly beneficial for utilization in manufacturing tire treads, said composition being comprised of (1) 30 phr to 80 phr of a non-random styrene-butadiene rubber comprised of polymer chains that are derived from styrene and 1,3-butadiene, wherein from about 10 weight percent to about 40 weight percent of the repeat units in the styrene-butadiene rubber are derived from styrene, wherein from about 60 weight percent to about 90 weight percent of the repeat units in the styrene-butadiene rubber are derived from 1,3-butadiene, wherein from about 30 weight percent to about 50 weight percent of the styrene repeat units are in sequences containing 5 to 20 styrene repeat units, wherein the bound styrene content found in the first half of the polymer chains differs from the bound styrene content found in the second half of the polymer chains by at least 5 weight percent, wherein the styrene-butadiene rubber has a 1,2-vinyl content which is within the range of about 8 percent to about 20 percent, wherein the styrene-butadiene rubber has a number average molecular weight which is within the range of 200,000 to 475,000, and wherein the styrene-butadiene rubber has a glass transition temperature which is within the range of −82° C. to −50° C. and (2) 20 phr to 70 phr of polybutadiene.

8. A rubber formulation as specified in claim 7 wherein the non-random styrene-butadiene rubber is present at a level which is within the range of about 30 phr to about 65 phr and wherein the polybutadiene is present at a level which is within the range of about 35 phr to about 70 phr.

9. A rubber formulation as specified in claim 8 wherein the styrene-butadiene rubber has a number average molecular weight which is within the range of 300,000 to 400,000.

10. A rubber formulation as specified in claim 9 wherein the styrene-butadiene rubber has a 1,2-vinyl content which is within the range of 10 percent to 15 percent.

11. A rubber formulation as specified in claim 10 wherein the styrene-butadiene rubber is present at a level which is within the range of 40 phr to 60 phr, and wherein the high cis-1,4-polybutadiene is present at a level which is within the range of 40 phr to 60 phr.

12. A rubber formulation as specified in claim 7 wherein said rubber formulation is further comprised of about 30 phr to about 80 phr of silica and from about 10 phr to 80 phr of lignin.

13. A rubber formulation as specified in claim 12 wherein said rubber formulation is further comprised of about 10 phr to about 30 phr of natural rubber.

14. A rubber formulation as specified in claim 13 wherein the non-random styrene-butadiene rubber is coupled.

15. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is a cured the rubber formulation which is comprised of (1) 30 phr to 80 phr of a non-random styrene-butadiene rubber comprised of polymer chains that are derived from styrene and 1,3-butadiene, wherein from about 10 weight percent to about 40 weight percent of the repeat units in the styrene-butadiene rubber are derived from styrene, wherein from about 60 weight percent to about 90 weight percent of the repeat units in the styrene-butadiene rubber are derived from 1,3-butadiene, wherein from about 30 weight percent to about 50 weight percent of the styrene repeat units are in sequences containing 5 to 20 styrene repeat units, wherein the bound styrene content found in the first half of the polymer chains differs from the bound styrene content found in the second half of the polymer chains by at least 5 weight percent, wherein the styrene-butadiene rubber has a 1,2-vinyl content which is within the range of about 8 percent to about 20 percent, wherein the styrene-butadiene rubber has a number average molecular weight which is within the range of 200,000 to 475,000, and wherein the styrene-butadiene rubber has a glass transition temperature which is within the range of −82° C. to −70° C. and (2) 20 phr to 70 phr of high cis-1,4-polybutadiene.

16. A tire as specified in claim 15 wherein the non-random styrene-butadiene rubber is present at a level which is within the range of about 30 phr to about 65 phr and wherein the high cis-1,4-butadiene is present at a level which is within the range of about 35 phr to about 70 phr.

17. A tire as specified in claim 16 wherein the styrene-butadiene rubber has a number average molecular weight which is within the range of 300,000 to 400,000.

18. A tire as specified in claim 17 wherein the styrene-butadiene rubber has a 1,2-vinyl content which is within the range of 10 percent to 15 percent.

19. A tire as specified in claim 18 wherein the styrene-butadiene rubber is present at a level which is within the range of 40 phr to 60 phr, and wherein the high cis-1,4-polybutadiene is present at a level which is within the range of 40 phr to 60 phr.

20. A tire as specified in claim 15 wherein the rubber formulation is further comprised of about 30 phr to about 80 phr of silica and from about 10 phr to 80 phr of lignin.

* * * * *